United States Patent [19]

Broeg

[11] 4,281,684
[45] Aug. 4, 1981

[54] BALANCED ROTARY-FACED VALVE

[75] Inventor: Helmut Broeg, Redondo Beach, Calif.

[73] Assignee: Dubro, Inc., Gardena, Calif.

[21] Appl. No.: 78,241

[22] Filed: Sep. 24, 1979

[51] Int. Cl.³ .............................................. F16K 11/06
[52] U.S. Cl. ............................ 137/625.21; 137/625.46
[58] Field of Search ..................... 137/625.21, 625.46, 137/625.22, 625.23; 251/283, 229

[56] References Cited

U.S. PATENT DOCUMENTS

| 2,229,931 | 1/1941 | Parker ............................... 137/625.22 |
| 2,990,853 | 7/1961 | Sharp ................................. 251/283 X |
| 3,696,710 | 10/1972 | Ortelli ........................... 137/625.21 X |
| 3,768,516 | 10/1973 | Cyphelly .......................... 137/625.46 |
| 3,892,259 | 7/1975 | McClocklin .................... 137/625.21 |

*Primary Examiner*—Alan Cohan
*Attorney, Agent, or Firm*—Christie, Parker & Hale

[57] ABSTRACT

A balanced rotary-faced valve for the control of the flow of pressurized hydraulic fluid to hydraulic apparatus having extend and retract ports is described. The valve has a sculptured body portion defining a flat land portion that contains a series of recesses, each one of the recesses in fluid communication with corresponding pressure, drain extend and retract ports. A rotary disk in sliding contact with the flat land portion has recesses capable of registration with corresponding recesses in the flat land portion. The disk is rotatable thereby controlling the flow of pressurized fluid within the valve. The rotary disk has passageways that guide the pressurized fluid to both sides of the disk so as to cause a slight force imbalance in a direction to urge the rotary disk towards the flat land portion. The rotary disk is controlled by a return to neutral spring-loaded control shaft.

In the neutral position, the recesses of the rotary disk overlay the recesses in the sculptured body portion such that the inletted pressurized fluid is circulated through the disk and out to drain. In the extend or retract position, the recesses in the rotary disk overlay the recesses in the sculptured body portion so that a fluid balance exists between the fluid entering and leaving the extend port and the fluid leaving and entering the retract port.

15 Claims, 5 Drawing Figures

BALANCED ROTARY-FACED VALVE

BACKGROUND OF THE INVENTION

This application relates to rotary-faced valves for the control of flow of pressurized fluid, and more particularly, to a valve that has a pressure balance across the faces of a rotary disk that controls the flow of fluid within the valve.

Rotary disk valves are known in the prior art. One class of device is described by Cyphelly in U.S. Pat. No. 3,768,516. Operation of the described device relies on the use of a rotary disk valve disposed between a pump and a hydraulically-actuated piston. The valve disk is provided with grooves to connect either side of the pistons selectively to pump and sump in order to extend and retract the piston. Cyphelly is directed to a rotary control valve in which the gap width between the fixed and movable valve parts that control the flow of pressurized hydraulic fluid is maintained by hydrostatic pressure of the controlled fluid. The fluid pressure in the gap is maintained by a pressure relief conduit and a throttling device coupled to the conduit for maintaining a pressure differential between portions of the conduit that are separated by the throttling device when the fluid flows through the conduit. Such construction, it is believed, gives rise to large forces acting in a direction to urge the fluid control members apart. Another problem of the device described is that forces exerted on the fluid sealing elements within the controlled chambers are high placing severe requirements on the sealing elements to prevent leakage between the movable parts of the valve.

Another such valve is described by Sharp in U.S. Pat. No. 2,990,853. Sharp describes a rotary valve having a valve plate which is both slideably and rotatably supported in a chamber adjacent the inlet and exhaust ports. Sharp attempts to balance the pressure on both sides of the valve plate by admitting a small amount of high-pressure inlet fluid to leak around the valve plate. The amount of fluid is sufficient to control the turning resistance of the valve plate. The pressure of the inlet fluid on the rotary member is thus counter-balanced by a fluid pressure force on an opposite side of the rotary member. Although Sharp describes pressure balance on both sides of the valve rotary member, the device includes slideable as well as rotary motion of the member, and the pressure balance is accomplished by pressure leakage around the valve plate. Such leakage, it is believed, causes the unwanted admission of pressurized fluids into the conduits that communicate with the devices being controlled. Thus, corrections must be made to compensate for the leakage-induced flow to the controlled device.

SUMMARY OF THE INVENTION

The present invention contemplates a balanced rotary-faced valve for controlling the flow of pressurized fluid to hydraulic apparatus having extend and retract ports. Means are provided for inletting pressurized hydraulic fluid to and draining pressurized hydraulic fluid from the valve. A valve body portion has a flat land portion having a plurality of recesses adjacent to and opening at the plane of the land portion. The recesses include two opposed pressurized fluid receiving recesses, a retract recess in fluid communication with the retract port, an extend excess in fluid communication with the extend port, and a drain recess in fluid communication with the pressurized fluid drain means. A pressure port means, in fluid communication with the pressurized hydraulic fluid inlet means, provides pressurized hydraulic fluid to a station at the land portion of the body. A disk having first and second faces, and an axis about which the disk rotates, has a first face in surface contact with the land portion of the body, the first face having pressure drain coupling recesses and extend and retract recesses capable of registration with the corresponding retract and extend recesses in the body portion. The second face of the disk is provided with means defining an annular groove. The disk has a first pair of diametrically opposed passageways between the groove and the first face of the disk, each of the passageways being in fluid communication with a corresponding body portion pressurized fluid receiving recess such that any reaction forces created thereby act in a direction coaxially with the axis of the disk. Means are also provided in the disk defining a second passageway for guiding pressurized fluid from the body portion station to the groove.

Seals are provided in the form of O-rings for preventing the pressurized fluid from flowing out of the groove except through the first pair of passageways. The sealing means has an area in contact with the pressurized fluid, thereby creating a predetermined counter force upon the second face of the disk so as to urge the disk towards the flat land portion. The counter force is in opposition to any pressurized fluid created force on the first face of the disk.

Means are provided for rotating the disk to neutral first and second positions such that in the neutral position the pressure drain coupling recess in the disk overlays corresponding pressure and drain recesses of the body providing fluid communication therebetween, and thus the inletted pressurized fluid flows from the pressure recess to the drain recess. In a second position, the extend recess in the disk overlays the pressure and extend recesses of the body, and the retract recess in the disk overlays the drain and retract recesses of the body providing fluid communication therebetween so that an equal amount of fluid entering the extend port exits from the retract port. In a third position, the retract recess in the disk overlays the pressure and retract recesses of the body, and the extend recess in the disk overlays the drain and extend recesses of the body providing fluid communication therebetween so that an equal amount of fluid entering the retract port exits from the extend port.

The sealing means, as herein described, gives rise to a predetermined counter force upon the second face of the disk. The counter force exceeds the force on the first face of the disk preferably by an amount of about approximately 3%, thus even though the valve operates with pressurized fluid, typically about in the range of 500 to 1800 psi, only a force of about 3% of such pressure acts to draw the disk and the flat body portion together. Thus, the ageing and wearing processes normally experienced in rotary-faced valves that operate with unbalanced pressures is minimized by the present invention. Additionally, due to the light force acting on the disk, the surfaces in mutual contact actually lap together so that a tighter fluid seal between the rotatable disk and the flat land portion occurs as a result of ageing.

The device described herein finds use in a broad range of applications requiring exacting control of pressurized fluid flows. By way of example, the valve finds particular utility as the flow control valve in various power steering apparatus.

DETAILED DESCRIPTION

Figure 1:
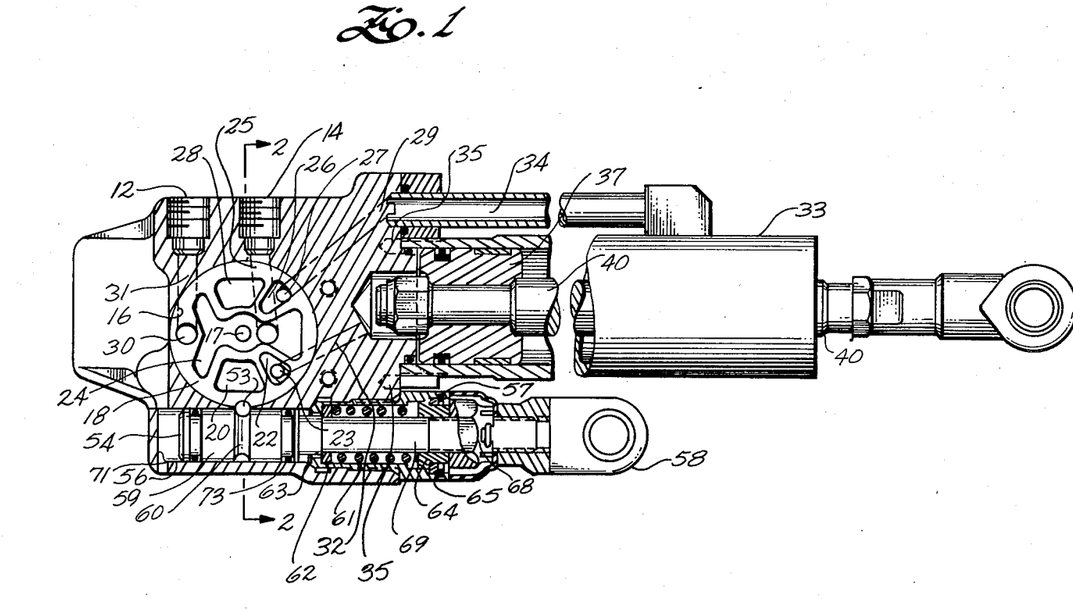
FIG. 1 is a partial cut away cross-sectional view of a balanced rotary-faced valve.

Referring now to FIG. 1, there is shown in cut away cross-section the body portion of the rotary-faced valve 10. Pressurized hydraulic fluid from a source thereof is inletted to the valve through pressurized fluid inlet 12, and the pressurized fluid is drained or returned to the source through drain 14. Located within the body is cylindrical cavity 16 having an axial pin 17 located at the axis of the cavity. The base of the cavity has a flat land portion 18 that is normal to the cavity axis. The base has recesses 20, 22, 24, 26 and 28 that open into the body portion from a location adjacent to the plane of the land portion. The recesses include: two opposed pressurized fluid receiving recesses 20 and 28; an extend recess 22 that is in fluid communication with an extend (first) port 23; a drain recess 24 that is in fluid communication with the drain 14; and a retract recess 26 that is in fluid communication with a retract (second) port 27. The drain recess 24 is coupled to the drain 14 by means of passageway 25 that extends between the recess 24 and the drain 14. A pressure port 30 located at a station at the land portion of the body is in fluid communication by means of passageway 31 to the pressurized fluid inlet 12.

A hydraulic cylinder 33, having a piston 37 capable of controlled reciprocal movement therein, is secured to the valve by means of locking bolts 35. Drive shaft 40, capable of coupling to apparatus to be actuated in response to operation of the valve, is secured to piston 37. In the secured position, the retract inlet 34 of cylinder 33 is in fluid communication with the retract port 27 by means of passageway 29, and the extend port 23 is in fluid communication with the extend inlet 36 by means of passageway 32.

Figure 2:
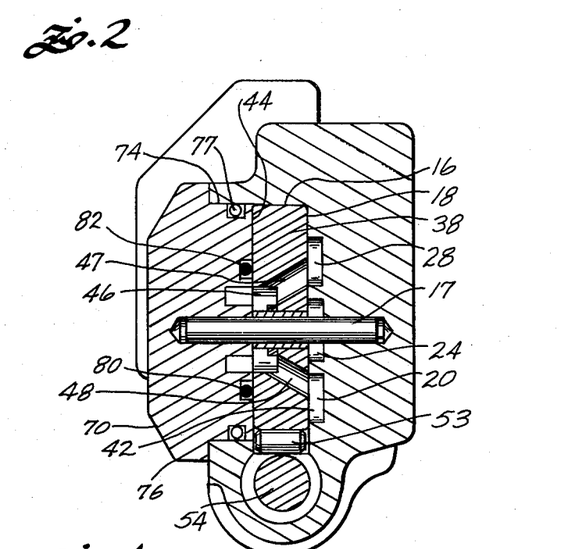
FIG. 2 is a cross-sectional view of the valve of FIG. 1 taken along line 2—2.
Figure 5:
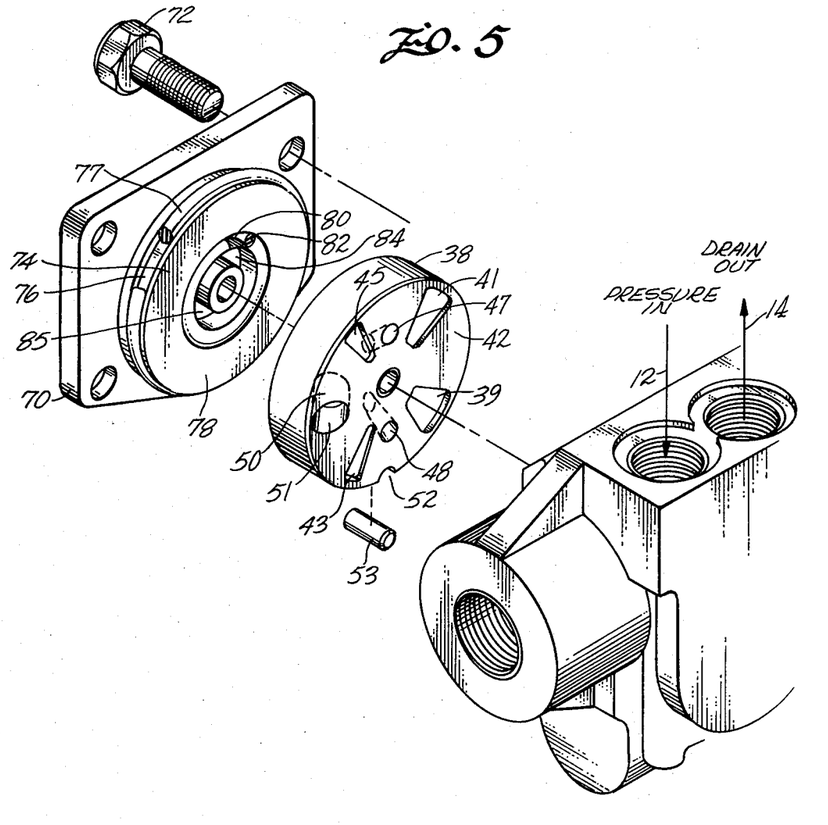
FIG. 5 is a fragmentary exploded perspective view showing a portion of the body, disk and cover plate of the balanced rotary-faced valve of FIG. 1.

Axially and rotatably mounted about the axial pin 17 is rotary disk 38 (see FIG. 2). The disk 38 has a diameter marginally smaller than that of the cylindrical cavity 16 thereby permitting rotation of the disk within the cavity. The disk 38 has two flat parallel faces 42 and 44. The face 42 of the disk is formed to provide a plurality of recesses capable of registration with the recesses in the body portion of the valve (see FIG. 5).

Located on the second face 44 of the disk is annular groove 46. The groove extends into the disk from the plane formed by the face 44. A pair of diametrically opposed passageways 47 and 48 extend between the groove and the first face 42 of the disk. A second passageway 50 is provided between the groove and a pressure inlet 51 located at the first face of the disk. In all normal disk positions, the pressure inlet 51 is in substantial registration with the pressure port 30.

A groove 52, preferably circular and having an axis parallel to the axis of the disk, is located at a station along the circumference of the disk. To be described later, the disk is coupled by means of a pin 53 located in the groove 52 to a control shaft wherein linear motion of the control shaft causes rotary motion of the disk.

The rotary disk 38 is held in place by means of cover plate 70. Cover plate 70 is secured to the valve body by means of locking bolts 72. Cover plate 70 has a raised cylindrical portion 74 having an annular groove 76 for seating a sealing O-ring 77. The O-ring 77 provides a fluid-tight seal between the groove 46 of the disk 38 and the cover plate 70.

Anchored about the periphery of cylindrical portion 74 in annular groove 76 is O-ring 77 which provides a fluid-tight seal. The raised cylindrical portion 74 has an essentially flat land portion 78 having a plane essentially normal to the axis of rotation of the rotary disk. As a consequence, the flat land portion 78 is parallel to the face 44 of the rotary disk.

The flat land portion 78 has an annular groove 80 which provides a seat for sealing O-ring 82. Annular groove 84 in the flat land portion of the cover plate is in registration with the annular groove 46 of the rotary disk 38.

Control shaft 54, capable of linear reciprocal movement, is slideably secured in shaft housing 56. At one end of the control shaft, there is mounted a clevis 58 for attachment to an exterior control mechanism (not shown) to urge the shaft in a desired direction. About the end portion 59 of the control shaft 54 is annular groove 60. The groove 60 is located at the circumference of the shaft and has a semi-circular cross-section. The pin 53 is cylindrical and is inserted between circumferential groove 52 of the disk 38, and the annular groove 60 of control shaft 54, and transmits the linear motion of the shaft to rotary motion of the disk. Return to the neutral position is provided by compression spring 61. Compression spring 61 is maintained in compression between flat washer 62 and stop washer 64 mounted about central portion 69 of the control shaft 54. In the neutral position, compression spring 61 causes flat washer 62 to be urged against annular boss 63. Additionally in the neutral position, spring 61 causes stop washer 64 to be urged against flat washer 65 which in turn is restrained by retaining ring 57 that is anchored in shaft housing 56. Locking nut 68, secured to the control shaft 54 at the end having the clevis, is also in contact with stop washer 64. Both the flat washer 62 and the stop washer 64 are adapted for slideable movement between the central portion 69 of control shaft 54 and the shaft housing 56. O-rings 71 and 73 anchored on the end portion 59 of the shaft 54 on either side of groove 60 form a fluid-tight seal between the area adjacent to the groove 60 and the shaft housing 56. The motion of the control shaft 54 outwardly from left to right, as viewed in FIG. 1 as a result of an outward pull on clevis 58, causes the flat washer 62 to be forced against annular boss 63, thereby compressing compression spring 61 against stop washer 64. Upon release of the outward pull on clevis 58, the compression spring 61, through the reaction force on flat washer 62 and annular boss 63, urges the shaft to return to the neutral position. With an inwardly-directed force on clevis 58, motion of the shaft is from right to left (as viewed in FIG. 1) so that the locking nut 68 engages the stop washer 64 urging it away from flat washer 65 and causing the spring 61 to be put again into compression. Upon removal of the inwardly-directed force, compression spring 61 urges, by means of the reaction force of the stop washer 64 against the locking nut 68, the control shaft 54 to be returned to the neutral position.

Figure 3:
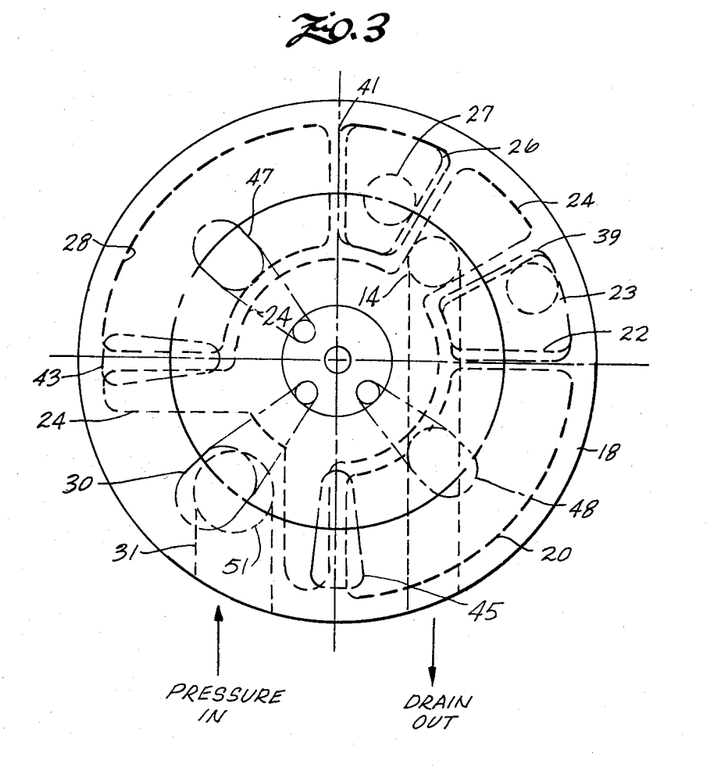
FIG. 3 is a view of a neutral position rotary disk in registration with the flat land portion of the balanced rotary-faced valve of FIG. 1.

In the neutral position of the disk 38 as shown in FIG. 3, the drain source coupling recess 43 of the disk (hidden portions thereof shown in phantom line) is positioned over the land portion 18, hidden portions thereof shown in dotted line, so that the pressure recess 28 in the body portion is in direct fluid communication with the drain recess 24. Similarly, the drain source coupling recess 45 is positioned over the flat land portion 18 so that the pressure recess 20 is in fluid communication with the drain recess 24. The retract recess 41 of the disk 38 is in registration with the retract recess 26 of the body, and the extend recess 39 of the disk is in registration with the extend recess 22 of the body. In this position, pressurized fluid enters the fluid inlet at 12 and passes to pressure port 30 through passageway 31. The pressurized fluid exiting from pressure port 30 enters the pressure inlet 51 of the rotary disk 38. The pressurized fluid exits from passageway 50 into the annular groove 46 in the face 44 of the rotary disk. The pressurized fluid fills the groove 46 as well as the annular groove 84 in the cover plate 70. The fluid is prevented from flowing away from the groove 84 and outwardly between the rotary disk and the cover plate by means of O-ring 82 that provides a fluid-tight seal between the disk and the flat land portion 78 of the cover plate. The pressurized fluid flows to pressure recesses 20 and 28 through pressure passageways 48 and 47 respectively. Thus, in the neutral position, fluid entering the rotary-faced valve through the pressure inlet is circulated through the rotary disk and exits through the drain. The surface area at the base 85 of the annular groove 84 that is in contact with the pressurized fluid provides an equivalent inwardly-directed force that urges the rotary disk 38 against the flat land portion 18. The inwardly-directed force acts along the axis of the rotary disk and opposes the outwardly-directed force that results from the surface area contact in the recesses in the rotary-faced valve with the pressurized fluid. The surface contact area at the base 85 of the annular groove 84 is adjusted so that there is a slight differential force that directs the disk inward towards the flat land portion. Thus, even though the fluid pressure ranges may for example exceed 2000 psi, only a corresponding net force of about 3% of such pressure is exerted on the disk against the land portion. Such low force levels between the disk and the body minimize the wearing of the disk and land portion so that valve life is greatly extended without loss of control or creation of fluid leakage between the disk and land portion.

Figure 4:
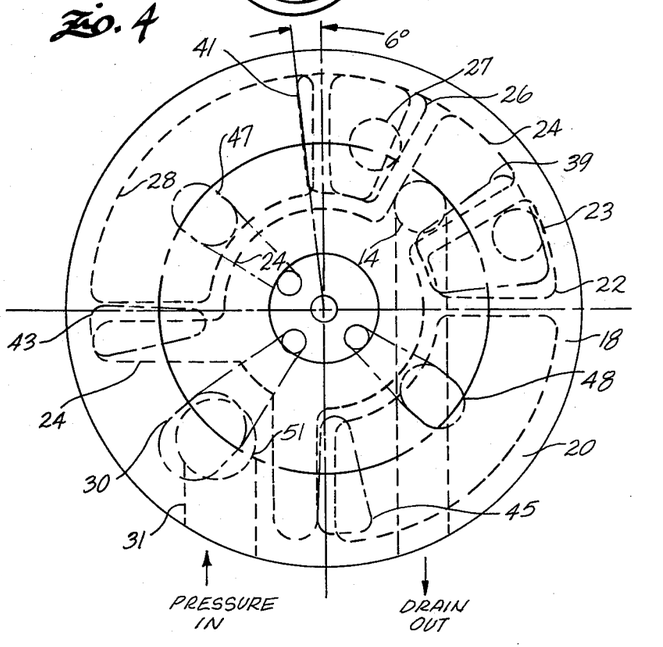
FIG. 4 is a view of the rotary disk in first position registration with the flat land portion of the balanced rotary-faced valve of FIG. 1.

Referring now to FIG. 4, there is shown the relative position of the rotary disk 38 (hidden portions thereof shown in phantom line) and the recesses in the flat land portion 18, hidden portions thereof shown in dotted line, for a desired retract command. In the retract position, the drain source coupling recesses 43 and 45 of the rotary disk are moved in a counter-clockwise position as viewed in FIG. 4 so that direct fluid communication between the pressure recess 28 and the drain recess 24, and the pressure recess 20 and the drain recess 24 is interrupted. The retract recess 41 bridges the flat land portion between the pressure recess 28 and the retract recess 26 providing fluid communication therebetween. Concurrently, the extend recess 39 in the rotary disk bridges the flat land portion between the drain recess 24 and the extend recess 22. In such a position, pressurized fluid is directed from the pressure recess 28 into retract recess 26, and therefore into retract port 27. The fluid exiting from the retract port 27 enters retract inlet 34 of the cylinder 33, thereby causing the piston 37 to be moved in a retract direction. The cylinder 33 is characterized in that for all positions of the piston a constant amount of pressurized fluid is maintained within the volume within which the piston travels. Thus, an equal amount of fluid is discharged from the extend port 23, and thus into drain recess 24, as enters the retract port 27 from the pressure recess 28. At the desired retract position, the rotary disk is returned by means of control shaft 54 to the neutral position, the piston remaining in the desired position until the rotary disk is caused to rotate to the extend position.

In the extend position, the retract recess 41 overlays the land portion 18 such that the retract recess 26 is in fluid communication with the drain recess 24, and the extend recess 39 overlays the land portion 18 such that the pressure recess 20 is in fluid communication with the extend recess 22, thus pressurized fluid is caused to flow into extend port 23 and into cylinder 33 by means of extend inlet 36. The entering pressurized fluid causes the piston 37 to move in an extend direction, and an equal amount of fluid as enters the cylinder through extend inlet 36 leaves the cylinder through retract inlet 34, and as described previously, maintains a constant level of pressurized fluid within the cylinder.

Although the description of operation has been in terms of a neutral extend and retract position, it should be noted that movement of the rotary disk is continuous in nature rather than discrete, so that the rate of fluid entering and exiting the cylinder 33 is controllable. Therefore the rates of extending and retracting are controllable. In the preferred embodiment, the maximum rotation of the disk in either the extend or retract position is about 6°.

It should be noted that back pressure from hydraulic apparatus coupled to the valve does not effect operation of the rotary valve. The pressure balance characteristic of the valve prevents chatter and oscillation on devices coupled to the valve drive shaft 40 such as steering wheels, handles, levers and the like.

While the basic principle of this invention has been herein illustrated along with one embodiment, it will be appreciated by those skilled in the art that variations in the disclosed arrangement both as to its details and as to the organization of such details may be made without departing from the spirit and scope thereof. Accordingly, it is intended that the foregoing disclosure and the showings made in the drawings will be considered only as illustrative of the principles of the invention and not construed in a limiting sense.

What is claimed is:

1. A balanced rotary-faced valve for controlling the flow of pressurized fluid to hydraulic apparatus having extend and retract ports, the valve comprising:

means for inletting and draining pressurized hydraulic fluid from the valve;

a valve body portion having a flat land portion and a plurality of recesses adjacent to and opening at the plane of the land portion, the recesses including two opposed pressurized fluid receiving recesses, a retract recess in fluid communication with the retract port, an extend recess in fluid communication with the extend port, and a drain recess in fluid communication with the pressurized fluid drain means;

pressure port means in fluid communication with the pressurized hydraulic fluid inlet means for providing pressurized hydraulic fluid to a station at the land portion of the body;

a disk having first and second faces and an axis about which said disk is rotatable, the first face in surface contact with the flat land portion of the body and having pressure-drain coupling recesses and extend and retract recesses capable of registration with corresponding retract and extend recesses in the body portion;

means defining an annular groove in the second face of the disk;

means defining a first pair of diametrically opposed passageways between the groove and the first face of the disk, each passageway in fluid communication with a corresponding body portion pressurized fluid receiving recess so that any reaction forces created thereby act in a direction coaxially with the axis of the disk;

means defining a second passageway through the disk for guiding pressurized fluid from the body portion station to the groove;

sealing means for preventing the pressurized fluid from flowing out of the groove except through the first pair of passageways, the sealing means having an area in contact with the pressurized fluid thereby creating a predetermined counter force upon the second face of the disk to urge said disk toward the flat land portion, in opposition to any pressurized fluid created force on the first face of the disk;

means for rotating the disk to neutral, first and second positions so that in the neutral position the pressure-drain coupling recesses in the disk overlays corresponding pressure and drain recesses of the body providing fluid communication therebetween and, thus, the inletted pressurized fluid flows from the pressure recess to the drain recess and so that in a first position the extend recess in the disk overlays the pressure and extend recesses of the body and the retract recess in the disk overlays the drain and retract recesses of the body providing fluid communication therebetween so that an equal amount of fluid entering the extend port exits from the retract port, and so that in a second position the retract recess in the disk overlays the pressure and retract recesses of the body and the extend recess in the disk overlays the drain and extend recesses of the body providing fluid communication therebetween so that an equal amount of fluid entering the retract ports exits from the extend port.

2. The rotary-faced valve according to claim 1 further comprising:

sealed cylinder means coupled to the extend and retract ports; and piston means axially slideable within the cylinder means such that when the disk is in the first position fluid enters the extend port and the piston moves in an extend direction, and when the disk is in the second position fluid enters the retract port and the piston moves in a retract direction.

3. The rotary-faced valve according to claim 1 wherein the disk has a groove at the circumference of the disk having an axis parallel to the disk, and the means for rotating the disk comprising:

shaft means for linear reciprocal motion, said shaft means having a groove having sides normal to the shaft means axis; and coupling pin means rotatably coupled between the circumferential groove on the disk and the shaft means groove such that linear motion of the shaft causes rotary movement of the disk about the disk axis.

4. The rotary-faced valve according to claim 3 wherein the shaft means includes spring means for urging the shaft means and therefore thd disk to the neutral position.

5. The rotary-faced valve according to claim 1 wherein the sealing means comprises:

means for opposing outward movement of the disk means;

means defining an annular groove substantially about the axis of the disk means, said annular groove having a surface contact area with the pressurized hydraulic fluid so that a predetermined force is created to urge the disk against the flat land portion; and O-ring means mounted in the sealing means and having a diameter larger than the annular groove in the sealing means, the O-ring means for providing a fluid tight seal between the sealing means and the disk.

6. A valve for controlling the flow of pressurized fluid to hydraulic apparatus having first and second ports, the valve comprising:

means for inletting and draining pressurized hydraulic fluid from the valve;

means for distributing and returning the pressurized fluid to and from the first and second ports;

disk means in fluid communication with the distributing means for controlling the amount of pressurized fluid distributed to and returned from the first and second ports;

means for providing a predetermined differential force across the disk means whereby the disk means is urged against the distributing means with such predetermined force;

means for moving the disk means about a neutral position thereof and relative to the distributing means for controlling the rate of distribution of the pressurized fluid to and from the first and second ports;

means for urging the disk means to the neutral position; and sealing means for opposing movement of the disk means in a direction away from the distributing means.

7. The valve according to claim 6 wherein the means for distributing and returning the pressurized fluid to and from the first and second ports comprises:

a valve body portion having a flat land portion and a plurality of recesses adjacent to and opening at the plane of the land portion, a different one of the recesses in fluid communication with the first and second ports, and the means for inletting and draining pressurized hydraulic fluid, the disk means having first and second planar parallel faces, the first face in surface contact with the flat land portion and having a plurality of recesses capable of registration with corresponding recesses in the body portion; and means for conducting the inletted pressurized fluid through the disk means and into corresponding recesses of the body portion.

8. The valve according to claim 7 wherein the means for providing a predetermined differential force across the disk means comprises:
means defining an annular groove in the second face of the disk means and an annular groove in the sealing means in registration with the annular groove in said second face; and
passageway means in the disk means for directing inletted pressurized fluid at the first face of the disk means to the annular groove in the second face, thence to corresponding recesses in the body portion, said predetermined force created by the pressurized fluid acting upon the annular groove in the sealing means and the annular groove in the second face.

9. The valve according to claim 6 wherein the means for moving the disk means comprises means for rotating the disk means about an axis of the disk means to a neutral position, a first position and a second position.

10. The valve according to claim 9 wherein the disk means is rotatable in a continuous manner between the neutral, first and second positions.

11. The valve according to claim 10 wherein the valve is coupled to hydraulic apparatus having extend and retract ports wherein the first port is in fluid communication with the extend port, and the second port is in fluid communication with the retract port and in the neutral position pressurized fluid is conducted from the inlet to the drain and in a first position pressurized fluid is conducted to the extend port, and an equal amount thereof is drained from the retract port and in the second position pressurized fluid is conducted to the retract port and an equal amount thereof is drained from the extract port.

12. The valve according to claim 6 wherein the disk means has a groove at the circumference of the disk means having an axis parallel to the disk means, and the means for moving the disk comprises:
shaft means for linear reciprocal motion, said shaft means having a groove having sides normal to the shaft means axis; and
coupling pin means rotatably coupled between the circumferential groove on the disk means and the shaft means groove such that linear motion of the shaft means causes rotary movement of the disk means about the disk axis.

13. The valve according to claim 12 wherein the means for urging the disk means to the neutral position comprises spring means coupled to the shaft means.

14. The valve according to claim 13 wherein the maximum angle of disk means rotation from the neutral position to either the first or second position is 6°.

15. A valve for controlling the flow of pressurized fluid to hydraulic apparatus having first and second ports, the valve comprising:
means for inletting and draining pressurized hydraulic fluid from the valve;
a valve body portion having a flat land portion and a plurality of recesses adjacent to and opening at the plane of the lane portion, a different one of the recesses in fluid communication with the first and second ports, and the means for inletting and draining pressurized hydraulic fluid;
disk means moveable between fully opened extend and retract positions, the disk means having a first planar face, the first face being in surface contact with the flat land portion and having a plurality of recesses capable of registration with corresponding recesses in the body portion;
means for conducting the inletted pressurized fluid through the disk means and into corresponding recesses of the body portion;
means for providing a differential force across the disk means such that the disk means is urged against the flat land portion;
means for moving the disk means about a neutral position thereof and relative to the valve body portion for controlling the rate of distribution of the pressurized fluid to and from the first and second ports, the recesses in the body portion and the disk means oriented such that no more than about 6° of movement of the disk means in a direction away from the neutral position provides fully opened extend position and no more than about 6° of movement of the disk means in the other direction from the neutral position provides fully opened retract position; and
sealing means for opposing movement of the disk means in a direction away from the flat land portion.

* * * * *

UNITED STATES PATENT AND TRADEMARK OFFICE
CERTIFICATE OF CORRECTION

PATENT NO. : 4,281,684
DATED : August 4, 1981
INVENTOR(S) : Helmut Broeg

It is certified that error appears in the above—identified patent and that said Letters Patent is hereby corrected as shown below:

In the specification: Column 1, line 67, "excess" should be --recess--.

In the claims: Claim 4, column 8, line 13, "thd" should be --the--; Claim 15, column 10, line 16, "lane" should be --land--.

Signed and Sealed this

Twelfth Day of January 1982

[SEAL]

Attest:

*Attesting Officer*

GERALD J. MOSSINGHOFF

*Commissioner of Patents and Trademarks*